G. S. TUGGLE.
REPLANTING ATTACHMENT FOR CULTIVATORS.
APPLICATION FILED JULY 12, 1907.
901,566.
Patented Oct. 20, 1908.
2 SHEETS—SHEET 1.
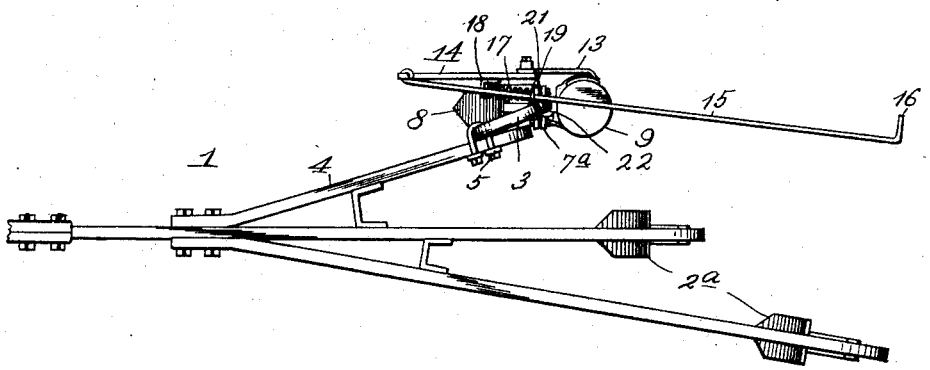
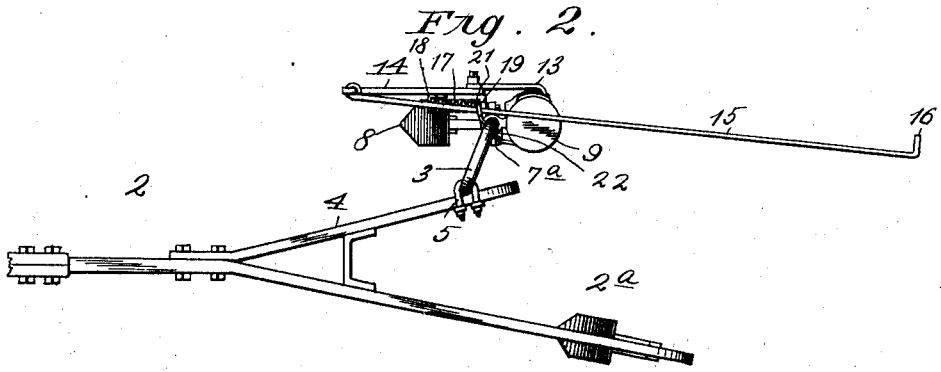
Witnesses:—
Inventor,
George S. Tuggle
By F. G. Fischer, atty.

G. S. TUGGLE.
REPLANTING ATTACHMENT FOR CULTIVATORS.
APPLICATION FILED JULY 12, 1907.
901,566.
Patented Oct. 20, 1908.
2 SHEETS—SHEET 2.
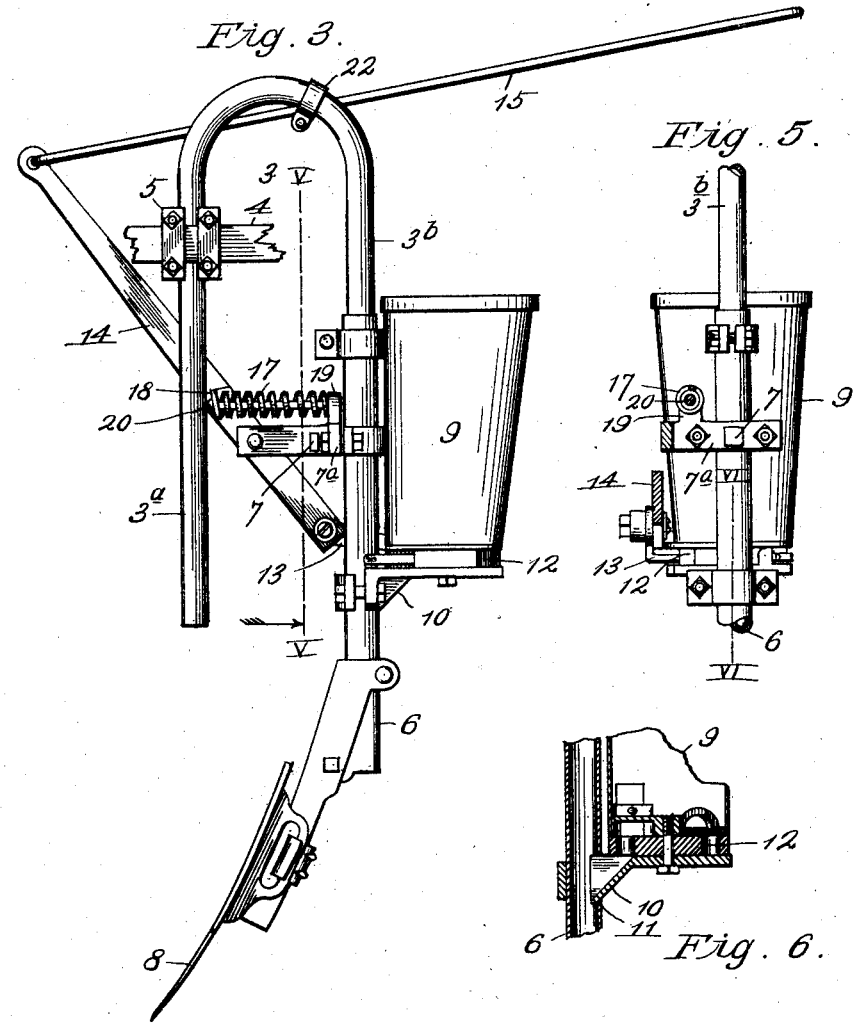
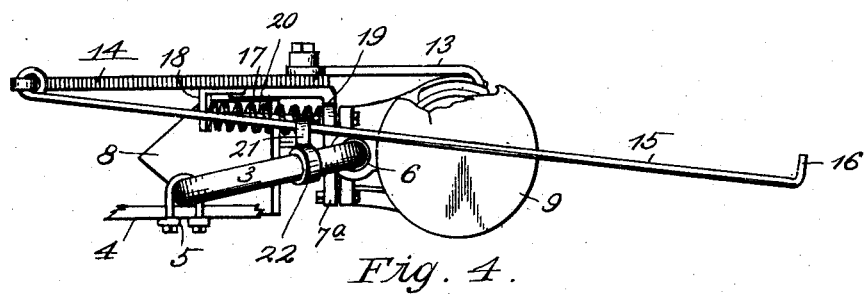
Witnesses:—
Inventor,
George S. Tuggle
By F. G. Fischer, atty.

UNITED STATES PATENT OFFICE.

GEORGE S. TUGGLE, OF BRAYMER, MISSOURI.

REPLANTING ATTACHMENT FOR CULTIVATORS.

No. 901,566.　　　　Specification of Letters Patent.　　　Patented Oct. 20, 1908.

Application filed July 12, 1907. Serial No. 383,367.

*To all whom it may concern:*

Be it known that I, GEORGE S. TUGGLE, a citizen of the United States, residing at Braymer, in the county of Caldwell and State of Missouri, have invented certain new and useful Improvements in Replanting Attachments for Cultivators, of which the following is a specification.

My invention relates to replanting attachments for cultivators; and my object is to provide an arrangement whereby the two operations of cultivating growing corn and replanting vacant hills may be proceeded with at the same time. But one attachment is required for a two-gang cultivator, and it is secured to one of the inner shovel-beams, so that when a vacant hill is approached the gang may be shifted laterally to bring the attachment in position for dropping the seed.
Referring now to the accompanying drawings, which illustrate the invention, Figures 1 and 2 represent the attachment secured to a three-shovel gang and a two-shovel gang, respectively. Fig. 3 represents an enlarged side elevation of the attachment. Fig. 4 is a plan view of the same. Fig. 5 is a broken section on line V—V of Fig. 3. Fig. 6 is a section on line VI—VI of Fig. 5.

1 designates a three-shovel gang and 2 designates a two-shovel gang, of any approved style of cultivator, to the inner shovel-beam of which (or the one next to the row of corn) my attachment is secured, so that when the inner shovel approaches a hill requiring replanting, the gang may be shifted inwardly in the customary manner and the seed dropped into the furrow made by the shovel, while the following shovel or shovels $2^a$ will cover the seed.

3 designates a member of inverted U-form, the front arm $3^a$ of which is secured to the inner beam 4 of the gang by a clip 5, while its rear arm $3^b$ is provided with a spout 6 telescopically secured thereto by a set screw 7 extending through a clip $7^a$, so that said spout may be adjusted vertically to regulate the depth at which the shovel 8, carried thereby, enters the soil.

9 designates a seed-box, of ordinary construction, secured to the spout so that it will be adjusted vertically with shovel 8 and thus retain its relative position thereto. Said seed-box has an outlet 10 communicating with an opening 11 in the spout, so that when the seed-box dropper 12 is actuated the seed will pass into said spout and be discharged thereby into the furrow made by shovel 8.

Hook 13 forming part of the seed-box dropper is pivotally secured at its forward end to a lever 14 fulcrumed to clip $7^a$, and provided at its upper end with a rearwardly-extending rod 15, having a handle 16, so that it may be drawn backward to actuate the lever when it is desired to operate the dropper. When the handle is released the parts are restored to normal position, see Fig. 3, by an expansion spring 17 interposed between lugs 18 19 on lever 14 and clip $7^a$, respectively.

Spring 17 embraces a bolt 20 extending through lugs 18 and 19 for the purpose of limiting the expansion of spring 17 and checking the forward movement of lever 14. Rod 15 is held in a convenient position to be grasped, by a ring 21 through which it extends, said ring being swiveled to a clip 22. Clip 22 is adjustably secured to the arched portion of member 3 so that when the seed-box is adjusted vertically, ring 22 may be adjusted thereon to retain the same relative slant of rod 15 shown in Fig. 3, so that the handle of said rod will always be within convenient reach of the driver.

Member $3^a$ has pivotal movement on the cultivator beam when clip 5 is loosened, so that its rear arm $3^b$ may be adjusted laterally with respect to said beam. This permits the seed-box and shovel 8 to be swung close to the beam when the attachment is applied to a three shovel gang, or swung away from the beam when attached to a two shovel gang, see Figs. 1 and 2, so that the shovels may be adjusted in proper relation to the rows of corn. By loosening clip 5 the attachment may also be adjusted vertically to regulate the depth at which shovel 8 enters the soil.

Spout 6, in addition to being telescopically arranged upon arm $3^b$, may also be adjusted axially thereon, so that shovel 8 may be pointed forwardly when arm $3^b$ is adjusted laterally with respect to beam 4.

Having thus described my invention, what I claim is.

1. In combination with a cultivator, a replanting attachment consisting of an inverted U-shaped member having one leg secured to one of the cultivator shovel-beams, a spout telescopically carried by the other leg of said member, a seed box carried by said spout so as to be adjustable with said spout, a shovel carried by the lower end of said spout, and means for operating the seed box dropper.

2. In combination with a cultivator, a replanting attachment composed of an inverted U-shaped member secured to the cultivator, a spout adjustably carried by one leg of said member, a seed box on the spout movable therewith, a dropper for said seed box, a lever pivotally supported from said spout and connected to said dropper, an operating rod for said lever, and means to pivotally support said rod adjustably secured on the arched portion of said U-shaped member.

3. In combination with a cultivator, a replanting attachment composed of a supporting member, a spout carried by said member, means whereby said spout may be adjusted on said member, a seed box having a dropper carried by said spout, a lever connected to said dropper and receiving pivotal support from said spout, means to operate said lever, and means adjustable on said support for pivotally engaging said lever operating means.

4. In combination with a cultivator, a replanting attachment composed of an inverted U-shaped member having one of its legs secured to said cultivator, a spout, means to adjustably support said spout from the other leg of said member, a seed box having a dropper carried by said spout, a lever pivoted to said dropper and to said spout, a rod pivoted to said lever, means for pivotally supporting said rod from the top of said U-shaped member, and a coil expansive spring disposed between said lever and said spout.

5. In combination with a cultivator, a replanting attachment comprising a support secured thereto, a spout and a seed box adjustably secured to said support, a dropper in the seed box, and means to operate said dropper including a lever pivoted thereto and to said spout, a rod pivoted to the lever, and means to pivotally support said rod from said support whereby when said spout and seed box are raised or lowered with respect to said support, said means may be correspondingly moved on said support.

In testimony whereof I affix my signature, in the presence of two witnesses.

GEORGE S. TUGGLE.

Witnesses:
   F. G. FISCHER,
   M. COX.